Patented May 7, 1946

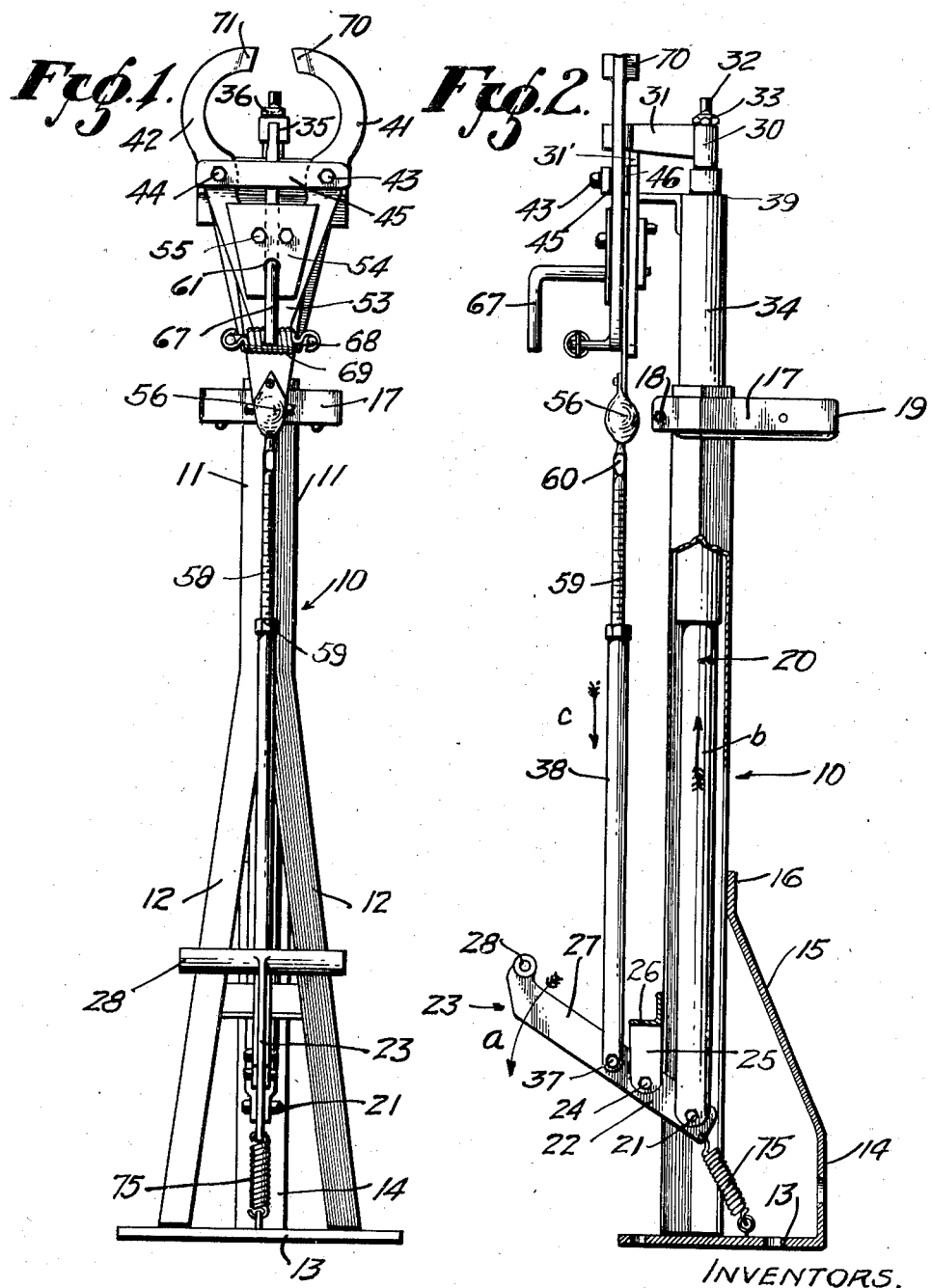

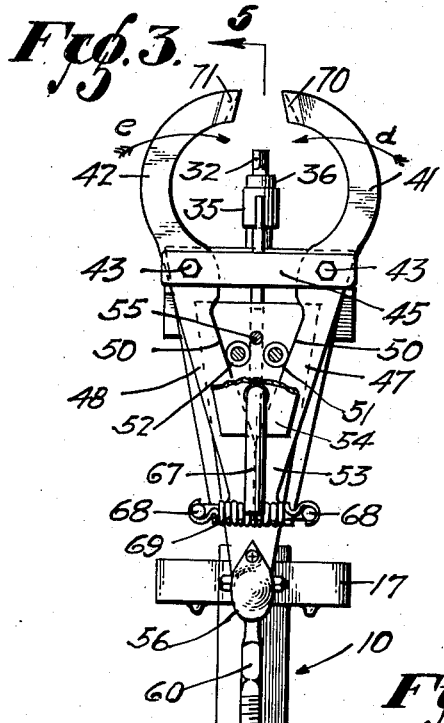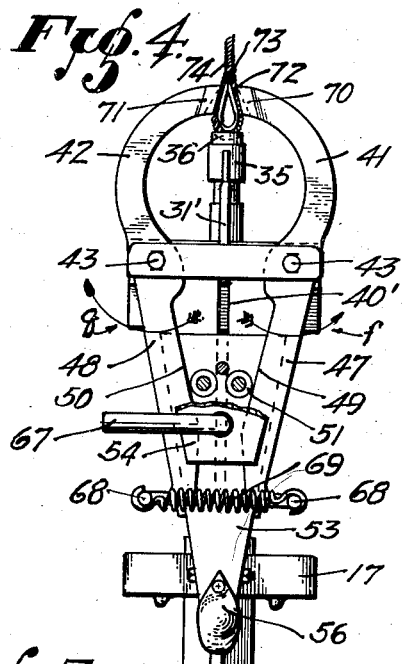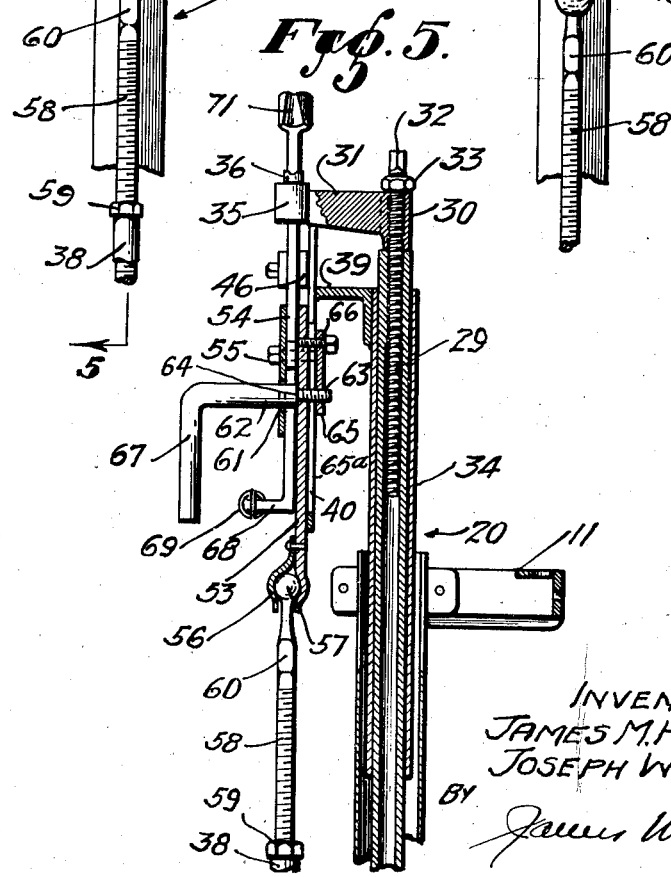

2,399,870

UNITED STATES PATENT OFFICE 2,399,870

VISE FOR SPLICING CABLES

James M. Huntington and Joseph W. Lawlor, La Canada, Calif.

Application July 17, 1943, Serial No. 495,400

3 Claims. (Cl. 81—17.5)

This invention relates to cable splicing equipment and particularly pertains to a vise for splicing cables.

At the present time various types of military equipment require the use of cables for different purposes, which cables are provided at one or both ends with a thimble around which the cable is wrapped and spliced. Such cables are usually made to relatively accurate specifications as to length and make it necessary for the thimbles to be spliced in a manner to insure that a specified cable length will be produced within a small limit of tolerance. In view of the fact that these cables are multiple strand cables usually made of steel, it is difficult to hold the cable around the thimble in a manner to insure accuracy of cable length and form a splice. Various types of vises have been provided for the purpose of gripping the thimble and holding the cable in position therearound while the splice is made. In many such devices a plurality of adjusting elements are required which must be set individually to grip the cable and its thimble and to hold the cable in a manner to maintain a definite cable length while the splice is being made. These devices for the most part have been cumbersome, have not properly held the cable either to maintain its length or to facilitate in a splicing operation, and furthermore, have required a considerable amount of time in order to set the adjusting elements preliminary to a splicing operation. It is the principal object of the present invention, therefore, to provide a cable splicing vise which includes a compound jaw structure disposed in a manner to be easily accessible and to make it possible for the cable to be quickly placed around a thimble or the like and to be gripped and firmly held with relation to the thimble, so that a predetermined cable length will be insured, and so that the operator may easily work around the gripped cable and thimble and produce a splice at a speed greatly in excess of the speed at which such operations are now performed.

It is another object of the present invention to provide a cable splicing structure which may be used either in a vertical or horizontal position, and which is equipped with interchangeable means to accommodate cables and thimbles of different sizes, the structure also being easily adjustable as to height at which the work is supported.

The present invention contemplates the provision of a cable splicing device having a rigid body member adapted to be disposed in either a vertical or horizontal position, and in connection with which a compound set of gripping jaws are provided to simultaneously engage the cable and thimble around which it is wrapped and to hold these elements rigidly while a splicing operation is performed, the structure being preferably operated by a foot treadle, which makes it possible for the jaws to be set and held without the use of screws or bolts and while leaving the hands free for such manual operations as are required.

The invention is illustrated by way of example in the accompanying drawings in which:

Figure 1 is a view in front elevation showing the complete machine.

Fig. 2 is a view in side elevation showing the structure disclosed in Fig. 1.

Fig. 3 is a fragmentary view showing the vise head and kindred parts with the jaws in their retracted positions and a portion of the retaining plate broken away.

Fig. 4 is a fragmentary view similar to Fig. 3 showing the jaws of the vise in their set positions.

Fig. 5 is a view in central vertical section through the vise head and its operating parts, as seen on the line 5—5 of Fig. 3.

Referring more particularly to the drawings, 10 indicates a standard. This standard is of novel construction in that it is made of two angle-iron elements having upper parallel portions 11 which are welded along their meeting edges and outwardly bent portions 12 which form the bracing legs of the standard. The lower ends of the leg sections 12 are welded to a base plate 13 which may be secured to the floor. The base plate has an extension 14 bent at right angles to the plate and lies in a vertical plane parallel to the standard. This extension is fitted with an arm 15 which is welded at 16 to the legs 12. At the upper end of the standard 10 is a fitting 17 which is secured around the standard by a clamping bolt 18 and has a face 19 in the same plane as the face of the extension 14. By this arrangement the entire structure may be disposed horizontally upon a bench or the like if desired, although it has been found more convenient to operate the vise in its upright position. It will be recognized that the portion 11 of the angle-bars forming the standard 10 will form a tubular member substantially square in cross-section. Through this tubular member a saddle operating rod 20 extends. The lower end of this rod is pivoted upon a pin 21 connected to lever 22 of a foot treadle 23. The treadle 23 is mounted upon a fulcrum pin 24 carried by lugs 25. These extend downwardly from a cross-bar 26 secured to the legs 12 of the standard. The outer end of the treadle forms a lever 27 which terminates in a bar 28 upon which the foot of the operator may press.

The upper end of the operating rod 20 is internally threaded and receives a threaded adjusting rod 29 which extends upwardly through the boss 30 of a horizontal arm 31. See Figs. 3 to 5. The upper end of the threaded rod 29 is formed with a squared portion 32 by which it may be rotated and a lock nut 33 by which the rod 29 may be set to dispose the arm 31 at different heights, for a purpose to be hereinafter described. The upper end of the operating rod 20 extends through a tubular member 34 which is secured within the upper end of the portion 11 of the standard 10. Mounted upon the free ends of the arm 31 is a saddle 35 which has an enlarged base portion to straddle the arm 31, and is also formed with an upwardly presented anvil 36 having an arcuate groove transversely of its upper face (Fig. 4) and conforming substantially to the arcuate curve of a loop of cable and to the circular form of the transverse section for a purpose to be hereinafter described. It will thus be seen that when pressure is applied to the portion 28 of the treadle 23 the operating rod 20 will be moved upwardly and will carry the anvil 36 with it. Pivotally mounted at 37 (Fig. 2) upon the lever portion 27 of the treadle is a pull rod 38 which extends parallel to the upright 10 and parallel to the rod 20. It will be seen that the rods 20 and 38 move in opposite directions, and that when a pull is exerted upon the rod 38 a thrust will be exerted upon the rod 20.

Secured upon the upper tubular member 34 is a bracket 39 (Fig. 5) which carries a fixed bearing plate 40. Pivotally mounted on the bearing plate and at opposite sides of the longitudinal center of the vise structure are vise arms 41 and 42. These are carried upon pivot screws 43 and 44 which are tied together at the front of the vise by a tie bar 45. Suitable spacing washers 46 are interposed between the vise arms 41 and 42 and the bearing plate 40. As shown in Fig. 4 of the drawings, the vise arm 41 is provided with a lever extension 47 and the vise arm 42 is provided with a lever extension 48. These levers extend downwardly in a common vertical plane and are provided with inclined wedge faces 49 and 50, respectively. Bearing against these faces are pressure rollers 51 and 52, respectively, which are carried upon a triangular shaped plate 53. This plate slides vertically on the front face of the bearing plate 40 and is held in slidable relation thereto by a retaining plate 54 which is secured in position by a cap screw 55. At the lower end of the plate 53 a socket structure 56 is mounted. This receives a ball 57 formed on the upper end of a threaded adjusting rod 58. The rod 58 is threaded into the upper end of the pull rod 38 and is set by a lock nut 59. A squared portion 60 occurs on the upper end of the threaded adjusting rod 58 so that the rod may be rotated with relation to its ball and socket joint to lengthen or shorten the combined reach of the rods 38 and 58.

Extending through an opening 61 in the retaining plate 54 is a lock shaft 62 which is reduced in diameter at its inner end to form a threaded portion 63. The shaft extends between the levers 47 and 48 and is formed with a shoulder 64 bearing against the plate 53. The portion 63 also extends through a slotted opening 65a in the bearing plate 40. The threaded end 63 of the lock shaft 62 is screwed into a lock plate 65 supported by a cap screw 66 from the plate 53. A handle 67 is formed at the outer end of the lock shaft 62 to rotate the same and to clamp the plate 53 in a desired position. Formed at the free ends of the levers 47 and 48 are extension pins 68 to which the opposite ends of a coil tension spring 69 are secured. This spring tends to hold the vise arms 41 and 42 in their outermost or retracted positions. The vise arms 41 and 42 are arcuate so that a convenient amount of clearance is provided around the anvil 36 to permit manipulation of a cable and thimble, and so that the free ends of the vise arms will swing toward and away from each other in a substantially horizontal plane.

The free ends of the arms 47 and 48 are formed with gripping jaws 70 and 71, respectively. These gripping jaws are formed with recesses in their faces. The recesses are arcuate in transverse section and are tapered so that they incline downwardly and outwardly. They thus conform to the taper of the thimble 72 around which a cable 73 is led, and which cable is spliced in position at 74.

Attention is directed to the fact that the saddle 35 and the anvil 36 formed as a part thereof may be interchanged to permit thimbles and cables of different diameters to be operated upon as occasion requires. It is also to be pointed out that the adjustment afforded by the rod 29 makes it possible to raise or lower the anvil 36 with relation to the work and to the position assumed by the jaws 70 and 71 when they are closed. Furthermore, the adjustment afforded by the pull rod 38 and the adjusting rod 58 makes it possible to change the stroke of the treadle and the pressure applied to the ends of the vise arms 41 and 42 and to their jaws.

In operation of the present invention the structure is assembled as shown with an anvil 36 of suitable configuration mounted upon the arm 31, after which cables are measured to a desired length from center to center of the thimbles. The cable is then supported over the vise and looped around a thimble so that the center mark made on the cable will substantially agree with the center position on the thimble. While thus held the foot treadle 23 is forced downwardly in the direction of the arrow $a$ (Fig. 2) by pressure applied to the member 28. This will cause the operating rod 20 to exert an upward thrust in the direction of the arrow $b$ and the pull rod 38 to exert a pull in the direction of the arrow $c$. As thrust is applied by the rod 20 the arm 31 will be lifted to lift the saddle 35 and the loop of cable resting thereon and looped around the thimble 72. As the anvil moves upwardly the jaws 70 and 71 of the vise arms 41 and 42 will swing toward each other in the direction of the arrows $d$ and $e$ (Fig. 3), and will cause the jaws to conform to the contour of the cable 73 as it is looped around the thimble 72 preparatory to making a splice. The swinging movement of the vise arms 41 and 42 is brought about due to the fact that the plate 53 is pulled downwardly with the pull rod 38 to force the rollers 51 and 52 against the faces 49 and 50 of the lever extensions 47 and 48. This will cause the levers to swing outwardly in the direction of the arrows $f$ and $g$ (Fig. 4), respectively, and will exert a desired pressure upon the jaws 70 and 71. When the anvil 36 and the jaws 70 and 71 have gripped the loop of cable 73 and the thimble 72 the handle 67 may be rotated to clamp the plate 53 so that it will not rise and allow the spring 69 to swing the vise arms apart. When the lock shaft 62 is rotated to release the structure the spring 69 will tend to swing the jaws apart and a spring 75 acting upon the end of lever 22 of the treadle 23 will tend to pull the operating rod 20 downwardly and force the pull rod 38 upwardly to restore the entire structure to its original condition, as shown in Figs. 1 and 3 of the drawings.

It is to be pointed out that due to the separate adjustment between the operating treadle and the vise arms and the adjustment between the treadle and the anvil, it is possible to obtain any desired throat space between the jaws 70 and 71 and the desired amount of pressure exerted upon the end of the thimble 72 by the anvil 36. In this way the loop of the cable may be forced to conform snugly to the seat around the periphery of the thimble and will hold the cable firmly in this position while the splice is made at 74. This insures that the cable will remain looped tightly around the thimble when released from the vise, and also insures that the cable length will be accurate.

In order to permit the plate 53 to move in relation to the plate 40 without getting out of alignment so that the pressure rollers 51 and 52 would apply unequal pressure to the levers 47 and 48, the longitudinal slot 65a in the bearing plate 40 is open at its upper end and extends downwardly a sufficient distance to accommodate the threaded portion 63 of the lock shaft 62 and the end of the cap screw 55. This insures aligned reciprocating movement of the plate 53 and also provides a guideway for a downwardly extending tongue 31' (Fig. 2) which depends from the outer end of the arm 31 carrying the anvil 36. Thus, the anvil is also guided to move in direct alignment centrally of the swinging vise arms 41 and 42.

Attention is also directed to the fact that a length of the upper end of the portions 11 of the standard 10 are free to move with relation to each other (Fig. 5) so that the bolt 18 may clamp them in a desired position with relation to the tube 34. When the tube is longitudinally adjusted with relation to the standard the vise structure will be disposed at a desired position and height for the convenience of workmen, after which the adjustment on the rods 20 and 38 may be set to adapt the structure for operation at the adjusted height.

It will thus be seen that the structure here disclosed provides a simple and effective vise within which a loop of cable and a thimble may be accurately positioned with relation to each other, and after which said structures may be clamped in said position to be firmly held so that a cable splicing operation may be accomplished efficiently and in a relatively short period of time.

While we have shown the preferred form of our invention as now known to us, it will be understood that various changes may be made in combination, construction and arrangement of parts by those skilled in the art, without departing from the spirit of our invention as claimed.

Having thus described our invention, what we claim and desire to secure by Letters Patent is:

1. In a device of the character described, a supporting pedestal, a vise head carried at the upper end thereof and disposed in a plane offset from and parallel to the supporting pedestal, a pair of vise arms mounted upon pivots at equal distances upon the opposite sides of the longitudinal center of said head, the upper free ends of said arms being arcuate and terminating in gripping jaws, a pair of lever arms, one connected to each of said vise arms, an anvil disposed in the space between the arcuate portions of said vise arms, movable means carried by the pedestal for supporting the anvil independently of the head, lever arm actuating means formed as a part of the head and engaging said lever arms for simultaneously moving the jaws of the vise arms toward each other, and means carried by the pedestal and connected with the anvil support and the lever arm actuating means whereby the jaws of the vise arms may be swung inwardly and the anvil moved simultaneously toward an object gripped by the jaws.

2. In a device of the character described, a vertical supporting pedestal, a vise head carried at the upper end thereof and disposed in a vertical plane offset from and parallel to the supporting pedestal, a pair of vise levers mounted intermediate their ends upon pivots and at equal distances upon the opposite sides of the longitudinal center of said head, the upper free ends of said levers being arcuate and terminating in gripping jaws, the lower free ends of said levers being formed with inwardly inclined faces, means yieldably urging the lower free ends of said levers toward each other, spreading means disposed between said lower free ends of the levers and mounted upon the head to reciprocate along the central vertical axis of the head, an anvil disposed between the arcuate ends of said levers, a vertically reciprocating support carried by the pedestal and upon which the anvil is supported independently of the vise head, a foot lever pivoted to the pedestal, means connecting said vertically reciprocating support to said foot lever, and means connecting the spreading means with the lever whereby downward movement of the lever will tend to move the spreading means and the reciprocating anvil support simultaneously toward gripping positions against an object to be held.

3. The structure of claim 2 including means incorporated in both of said connecting means for adjustably varying the movement of the anvil and the gripping jaws.

JAMES M. HUNTINGTON.
JOSEPH W. LAWLOR.